Sept. 17, 1935.    H. KILFITT    2,014,898
VIEW FINDER FOR PHOTOGRAPHIC CAMERAS
Original Filed Nov. 1, 1933
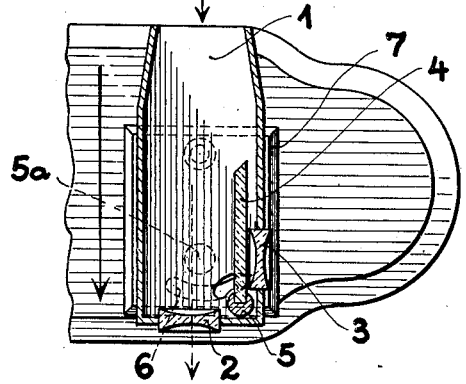
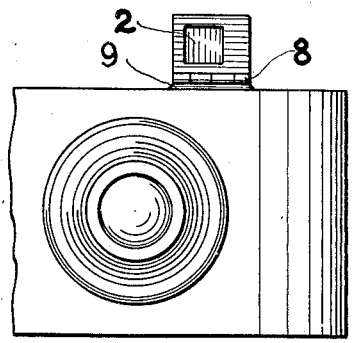
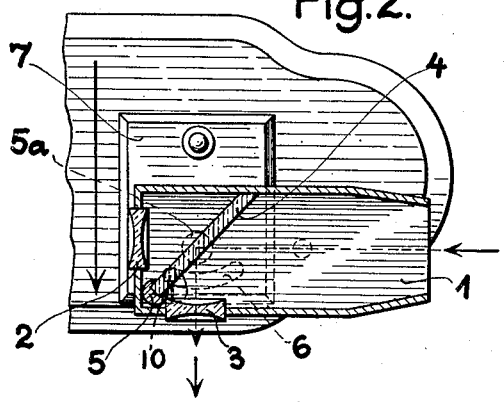
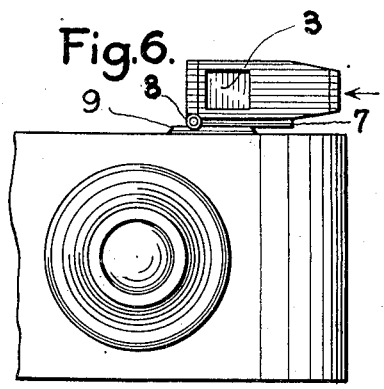
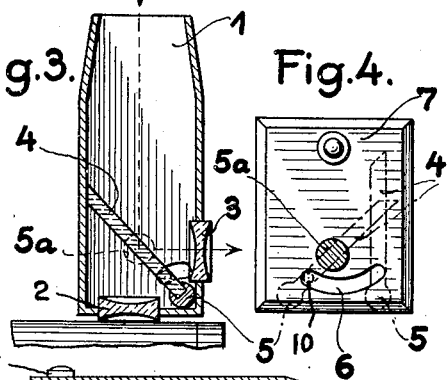
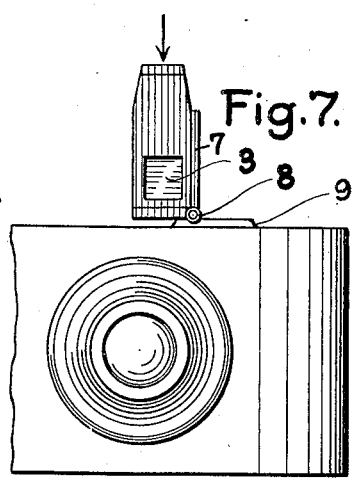
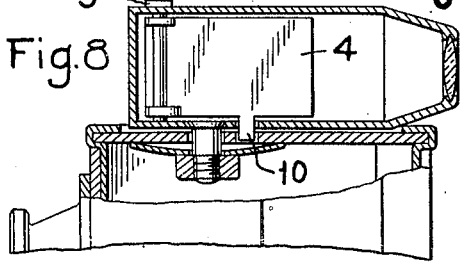
Inventor.
Heinz Kilfitt
By Frank S. Appleman
Atty Patented Sept. 17, 1935

2,014,898

UNITED STATES PATENT OFFICE 2,014,898

VIEW FINDER FOR PHOTOGRAPHIC CAMERAS

Heinz Kilfitt, Dusseldorf, Germany, assignor to Otto Berning & Co., Schwelm, Germany, a firm of Germany Original application November 1, 1933, Serial No. 696,251. Divided and this application April 25, 1934, Serial No. 722,370. In Germany January 7, 1932

6 Claims. (Cl. 88—1.5)

This invention relates to view finders for photographic cameras, more particularly for cameras of small external dimensions. The invention of this application is divided out of my parent application filed November 1, 1933, Serial Number 696,251.

For very small cameras, which operate substantially automatically, a corresponding view finder is required. Such small cameras are often used for the taking of pictures which must be taken unostentatiously. This circumstance is taken into account by the view finder according to the invention as it may be used both as a direct view finder and, as an angle and a top view finder and, in spite of the automatic mirror adjustment, exhibits a very small conformation which occupies little space.

According to this invention, the view finder, oscillatable as a whole, is secured externally of the camera casing in such a manner that the mirror is automatically adjusted when the view finder is swung.

In the accompanying drawing:—

Figs. 1, 2 and 3 show the view finder in axial section with different positions of the mirror, Fig. 4 shows the base plate with a curved slot for the view finder, Figs. 5, 6 and 7 are front elevations showing the view finder on the camera casing in different positions of use; and Figure 8 is a view of a modified construction.

Fig. 1 shows the view finder in the direct view position, Fig. 2 as an angle view finder and Fig. 3 as a top view finder, the full-line arrow giving the direction of the axis of the view finder. The view finder has an inspection opening 1 and two observation openings 2 and 3. A mirror 4 disposed in the interior is adapted to rock about the pivot 5.

In the direct view position (Fig. 1) the mirror 4 is disposed parallel to the longitudinal axis of the view finder and thereby covers the lateral observation opening 3. The line of sight passes directly through the openings 1 and 2. The view finder may be swung about a pivot such as 5a. If it is rotated by 90° (Fig. 2), the mirror 4 will receive a rotation of 45°. The eye, looking through the inspection opening 1, will observe an image which has been turned through 90° by the mirror. The automatic positioning of the mirror by the rotation of the view finder is effected by very simple means. The mirror has at its lower edge a projecting nose 10 which protrudes from the under side of the housing or base of the view finder. This nose engages in a curved slot 6 (Fig. 4) which can be formed in the wall of the camera as shown in Figure 8 or in a special base plate 7. By rotating the view finder about the pivot 5a, the curved slot effects the desired adjustment of the mirror 4, as shown in Fig. 4.

If the view finder is to be used as a top view finder, the base plate 7 is provided with a lateral hinge 8, which connects it with a mounting 9 and permits the view finder to take up a vertical position from the angle view finder position. Figs. 5, 6 and 7 show the view finder in the direct, angle and top view finder positions. This third adjustment as a top view finder is only made possible by the provision of two observation openings instead of the usual two inspection openings.

What I claim is:—

1. A view finder for photographic cameras comprising a casing having an inspection opening at one end, an observation opening at its other end and an observation opening in a side wall, a mirror in said casing pivoted between the observation openings for swinging movement from a position longitudinally of the casing in covering relation to the side observation opening to a diagonal position across the end observation opening, a support, means to pivotally connect said casing with said support for turning about an axis parallel to the pivot of the mirror, and means for automatically swinging the mirror about its pivot as the casing is turned.

2. A view finder comprising a casing having an inspection opening, an observation opening opposite thereto and an observation opening transversely of the first observation opening, a mirror in said casing shiftable from a position in covering relation to the second observation opening to a diagonal position across the first observation opening, a support, means to pivotally connect said casing with said support for movement into position for disposing a selected observation opening in position for use, and means for automatically adjusting the position of the mirror when the casing is moved about its pivot.

3. A view finder having an inspection opening, an observation opening in opposed relation thereto and a second observation opening disposed at an angle of substantially 90° and located between the inspection opening and the first observation opening to one side of the first observation opening, a mirror mounted for movement from a position in covering relation to the second observation opening to a position across the first observation opening at substantially 45° to the second observation opening for interrupting the view through the first observation opening and reflecting views received through the second observation opening to the inspection opening, a base, means movably connecting said finder with said base whereby the finder may be positioned for disposing a selected observation opening in position for use, and means for automatically shifting the position of the mirror when the finder is moved.

4. A view finder having observation openings at right angles to each other and an inspection opening opposite one observation opening, a base, means for pivotally connecting the finder with the base whereby the finder may be positioned for disposing a selected observation opening in position for use, a mirror pivotally mounted for movement from a position at 45° to one observation opening for reflecting views to the inspecting opening to a position for covering the said observation opening and permitting a clear view from the inspecting opening through the other observation opening, and means for automatically swinging the mirror about its pivot as the finder is turned about its pivot.

5. A view finder comprising a mounting formed with an arcuate slot, a casing pivoted intermediate its ends to said mounting and formed with a slot partially overlying the slot of the mounting, the casing having an inspection opening at one end, an observation opening at its other end and a second observation opening in a side adjacent the first observation opening, a mirror in said casing pivoted between the observation openings for movement from a position across the second observation opening to a diagonal position across the first observation opening in reflecting relation to the second observation opening and the inspection opening, and a pin extending from said mirror through the slot of the casing and engaged in the arcuate slot formed in the mounting for tilting the mirror about its pivot as the casing is turned about its pivot.

6. A view finder comprising a base plate, a casing pivoted intermediate its ends to said plate and provided with observation openings in its side and one end and an inspection opening in its other end, an arcuate slot being formed in the base plate and the casing being formed with an arcuate slot registering with the slot of the base but curved in a reverse direction, a mirror in said casing extending longitudinally therein and pivoted at one end between the observation openings, and a pin extending from a side of the mirror through the slot of the casing and engaged in the slot of the base plate for tilting the mirror about its pivot when the casing is turned about its pivot and moving the mirror from a position across the observation opening in the side of the casing to a diagonal position across the observation opening in the end of the casing in reflecting relation to the side opening and the inspection opening.

HEINZ KILFITT.